US012169711B2

(12) United States Patent
Sharma et al.

(10) Patent No.: US 12,169,711 B2
(45) Date of Patent: Dec. 17, 2024

(54) SYSTEM AND METHOD FOR LIFECYCLE MANAGEMENT OPTIMIZATION

(71) Applicant: InContact Inc., Salt Lake City, UT (US)

(72) Inventors: Harshit Kumar Sharma, Pune (IN); Abhishek Pandey, Pune (IN); Darshan Ambhaikar, Pune (IN)

(73) Assignee: InContact Inc., Salt Lake City, UT (US)

( * ) Notice: Subject to any disclaimer, the term of this patent is extended or adjusted under 35 U.S.C. 154(b) by 847 days.

(21) Appl. No.: 17/164,413

(22) Filed: Feb. 1, 2021

(65) Prior Publication Data

US 2022/0244948 A1   Aug. 4, 2022

(51) Int. Cl.
G06F 8/70 (2018.01)
G06F 8/60 (2018.01)
H04L 67/00 (2022.01)
H04L 67/10 (2022.01)

(52) U.S. Cl.
CPC ............... G06F 8/70 (2013.01); H04L 67/10 (2013.01); H04L 67/34 (2013.01); *G06F 8/60* (2013.01)

(58) Field of Classification Search
CPC ............. G06F 8/70; G06F 8/60; H04L 67/10; H04L 67/34
See application file for complete search history.

(56) References Cited

U.S. PATENT DOCUMENTS

| | | | | |
|---|---|---|---|---|
| 7,110,525 | B1 * | 9/2006 | Heller | H04M 3/523 379/265.11 |
| 7,966,187 | B1 * | 6/2011 | Pettay | G10L 15/26 704/270.1 |
| 9,225,833 | B1 * | 12/2015 | Koster | H04M 3/42221 |
| 10,114,816 | B1 * | 10/2018 | Srivastava | G06F 40/253 |
| 10,432,783 | B2 * | 10/2019 | Eggiman-Ketter | H04M 3/2281 |
| 10,812,658 | B1 * | 10/2020 | Veloso | H04M 3/5232 |
| 2005/0135600 | A1 * | 6/2005 | Whitman, Jr. | H04M 3/51 379/266.08 |
| 2005/0257101 | A1 * | 11/2005 | Adams | G01R 31/31937 714/48 |
| 2006/0095273 | A1 * | 5/2006 | Montvay | G06Q 50/188 379/266.08 |
| 2006/0123331 | A1 * | 6/2006 | Hightower | G06F 40/174 715/224 |
| 2007/0133780 | A1 * | 6/2007 | Berner | H04M 3/5166 379/265.01 |
| 2008/0118050 | A1 * | 5/2008 | Rodenbusch | H04M 3/5158 379/265.02 |

(Continued)

OTHER PUBLICATIONS https://docs.microsoft.com/en-us/azure/storage/blobs/lifecycle-management-overview?tabs=azure-portal, published Nov. 17, 2021.

(Continued)

*Primary Examiner* — Lewis A Bullock, Jr.
*Assistant Examiner* — Theodore E Hebert
(74) *Attorney, Agent, or Firm* — PEARL COHEN ZEDEK LATZER BARATZ LLP

(57) ABSTRACT

A method, system, and non-transitory processor-readable medium for optimizing lifecycle rule computer processing including: selecting a set of lifecycle rules to apply to interactions, finding a set of interactions satisfying criteria associated with the lifecycle rule; calculating an associated rule occupancy score based on the number of executed interactions associated with the rule, and executing the rule based on the rule occupancy score associated with the rule.

17 Claims, 4 Drawing Sheets

(56) References Cited

U.S. PATENT DOCUMENTS

| | | | | |
|---|---|---|---|---|
| 2008/0219243 | A1* | 9/2008 | Silverman | H04M 3/5175 |
| | | | | 370/352 |
| 2011/0150208 | A1* | 6/2011 | Stearns | H04M 3/5158 |
| | | | | 379/266.07 |
| 2012/0102501 | A1* | 4/2012 | Waddington | G06F 9/5061 |
| | | | | 718/105 |
| 2014/0136557 | A1* | 5/2014 | Lilienthal | G06F 7/58 |
| | | | | 707/754 |
| 2014/0355748 | A1* | 12/2014 | Conway | H04M 3/523 |
| | | | | 379/265.1 |
| 2018/0246701 | A1* | 8/2018 | Kawai | G06F 7/584 |
| 2020/0092419 | A1* | 3/2020 | Murali | G10L 25/24 |
| 2020/0226277 | A1* | 7/2020 | Roden | G06F 21/629 |
| 2020/0294528 | A1* | 9/2020 | Perri | G06Q 10/06395 |
| 2020/0412868 | A1* | 12/2020 | Jones | H04M 3/5232 |
| 2021/0019981 | A1* | 1/2021 | Nitz | G07F 17/3241 |

OTHER PUBLICATIONS https://cloud.google.com/storage/docs/lifecycle, "Object Lifecyle Management", printed Feb. 15, 2022.
https://docs.aws.amazon.com/AmazonS3/latest/userguide/object-lifecycle-mgmt.html,"Managing your Storage Lifecyle" printed Feb. 15, 2022.

* cited by examiner

SYSTEM AND METHOD FOR LIFECYCLE MANAGEMENT OPTIMIZATION

FIELD OF THE INVENTION

The present invention relates generally to lifecycle management in cloud based software deployment models. In particular, some embodiments relate to controlling the use of rules affecting storage and movement of data in for example Contact Center as a Service (CCaaS) technologies.

BACKGROUND OF THE INVENTION

CCaaS technology is a contact center service that is hosted or built on the cloud, an Internet-based provisioning of storage, computing power, or application software as a service. CCaaS enables companies to take advantage of state-of-the-art technologies without making huge investments into contact center infrastructure. One of the most important benefits of CCaaS is allowing companies to instantly scale contact center technologies to meet business and customer demands/needs. CCaaS cloud services may include benefits including an ability to add or reduce the number of customer service agents, avoid the need for self-licensure, circumvent the need for buying expensive storage or servers, and allowing a client to only pay for what is needed/used. Software implementation, product upgrades, or troubleshooting the contact center in case of failure, may all be benefits provided by a CCaaS technology. CCaaS ensures reliability of service, availability, disaster recovery of data, and guarantees a contact center is always up and running.

Lifecycle management is an integral part of a CCaaS solution. In any CCaaS solution or application lifecycle, files or documents such as interactions (e.g. voice recordings, screen recordings, video recordings, emails, and chat transcripts and attachments, etc.) should be appropriately archived or deleted/purged. For example, assume a customer service case agent has a chat interaction with a customer and the resultant case was resolved. This interaction may need to be moved and archived for future reference, for example, if future problems arise such as e.g. warranty claims. The defining rules governing how interactions are moved (e.g. deleted or archived) is known in the art as lifecycle rules. Lifecycle rules allow for interactions to automatically be reviewed and placed in compliance with security, legislative compliance, internal policy compliance, or is done for general housekeeping of a company's resources.

Executing lifecycle rules on a large number of interactions is a continuous and resource-intensive process as thousands of lifecycle rules must be processed. Typically, this is done in a batched manner to prevent overwhelming the resources of a system. In current technologies, there are equal amounts of processing opportunities given to each of the lifecycle rule generating backlogs for some of the lifecycle rules. Therefore, processing opportunities for lifecycle rules are wasted, computing resources remain idle for the processed lifecycle rules where no or few interactions are selected to be processed. Some difficulties with current lifecycle rules processing methods is that only a limited set of lifecycle rules can be processed per batch, and each rule executes only a limited number of interactions. In addition, there are also variations in the number or volume of interactions being processed thereby causing asymmetric processing opportunities for different lifecycle rules. For example, lifecycle rules that need to process a high volume of interactions do not get enough processing opportunities and end up creating a backlog whereas lifecycle rules that need to process a low volume of interactions end up wasting the processing opportunities. The result for a CCaaS vendor is not only lost operational efficiency of lifecycle rules processing, but dissatisfaction of a CCaaS client.

Therefore, it can be desirable to provide increased productivity of lifecycle rules processing, thereby optimizing computing resources, saving cost and improving CCaaS client satisfaction.

SUMMARY

Embodiments include optimizing lifecycle or other computer rule execution or processing. Rules such as lifecycle rules may be selected to apply to interactions. For each lifecycle rule, the set of interactions may be filtered for a subset of interactions satisfying criteria associated with the lifecycle rule. Each lifecycle rule may have a rule occupancy score (ROS) which may represent the number or volume of interactions executed during the processing opportunity of a lifecycle rule. The processing opportunity may be the period of time during which the execution of lifecycle rules occurs. The lifecycle rule may then be selected (or not selected) to be processed based on the ROS associated with the lifecycle rule.

Embodiments include determining the processing opportunities to be given to lifecycle rules based on the number of interactions processed by the lifecycle rule in the last processing opportunity given.

Embodiments describe a data-driven decision to allocate the processing opportunities to the lifecycle rules based on the interactions being processed in the last execution of the lifecycle rule taking into account variations in the number or volume of interactions to be processed. Lifecycle rules that do not have enough interactions to process may have their execution suspended for the specified time period so that other lifecycle rules which have more interactions to process may get more processing opportunities.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
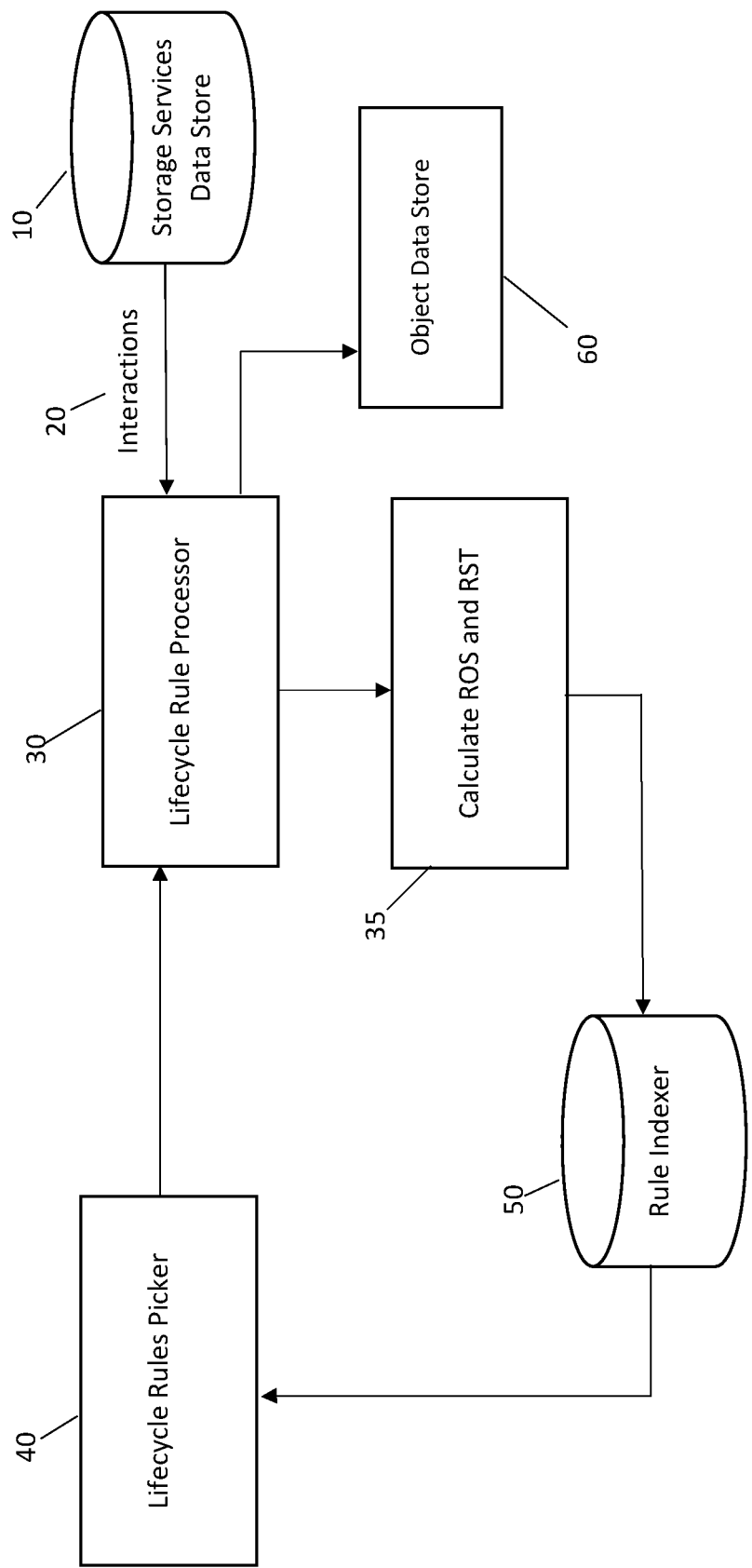
FIG. 1 is a block diagram of a system for lifecycle rules management according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

In CCaaS systems, there may be thousands of lifecycle rules to be processed (the rules when processed in turn process files such as interactions), however, due to the bandwidth of processing power available, not all lifecycle rules can be executed. Systems may have to perform triage and selectively execute lifecycle rules based on an analysis of how many interactions are processed for a lifecycle rule. Embodiments may efficiently control execution of or selection of lifecycle rules based on client-specific needs taking into account the number or volume of interactions processed in the previous processing cycle. Each cycle of a lifecycle rule processing may query interactions satisfying criteria— e.g. a filter—associated with the lifecycle rule. The resultant volume of interactions matching the query criteria may be used to calculate an associated metric such as a ROS for each lifecycle rule.

An ROS may measure the number or volume of interactions matching the lifecycle rules criteria. This number or volume of interactions may be embodied in a variable called Search_Result_Size. In some use cases, for each lifecycle rule satisfying the lifecycle rules criteria as part of the lifecycle rule picker, there might be hundreds of thousands of documents, files or interactions eligible for processing by a lifecycle rule but only a limited number of interactions are picked for execution in a given processing opportunity to the lifecycle rule.

A maximum number of or threshold for a set of interactions may be used to limit the number of interactions in a single cycle in some cases to eliminate the possibility of overwhelming the system. This maximum number may be embodied in a variable called Max_Size. Therefore, an ROS value may be a ratio of the Search_Result_Size in relation to the Max_Size. Initially, or at the creation of any new life cycle rule, the ROS value for the lifecycle rules may be defaulted to 1. Thereby, in the first cycle, lifecycle rules may be executed without suspension. Lifecycle rules may be selected for execution based on such previous measurements of number of interactions applicable to the rule. Benefits may occur such as executing only lifecycles rules which process more interactions, thereby given more processing opportunities. Therefore, lifecycle rules may be executed based on the ROS associated with the lifecycle rules.

FIG. 1 illustrates a system for lifecycle rules management. While FIG. 1 shows a system in the context of a contact center, and using lifecycle rules, embodiments of the invention may be used in other contexts. Rules or execution entities processing data other than interactions, such as documents, images, video files, etc. may be used. Incoming interactions 20 (e.g. data representing conversations, telephone calls, IVR interactions, etc., in text, audio recording, video recording, graphic, or other form) among people (e.g., customers and agents) may be selected from storage services data store 10. In the Amazon AWS system, interactions may be referred to as objects. The storage of such objects may be, in the Amazon AWS system, in entities known as buckets. Storage services data store 10 may contain information related to files, documents or interactions 20, such as the content or substance of interactions (e.g. recordings and/or transcripts of telephone calls) and metadata (e.g. telephone numbers used, customer identification (ID), etc.). Interactions 20 stored in storage services data store 10 may be selected to have applied to them lifecycle rules or policies matching the lifecycle rules selected by lifecycle rules picker 40. Interactions 20 matching the criteria or filter (e.g. "if" portion) of the lifecycle rules selected by lifecycle rules picker 40 may be processed by lifecycle rules processor 30, executing the action to be performed on interactions 20. Typically, actions are defined by the lifecycle rules.

Attributes of lifecycle rules may be used to filter interactions satisfying the lifecycle rules and may include for example:

Media Type: File formats for which the lifecycle rule is being defined. Media type may be client-based and need not be limited to any specific format. Interactions data may be grouped by media types, for example, a lifecycle rule may filter interactions, by selecting interactions which match the media type and ignoring the media type which does not match the media type. For example, based on the attribute of the media type of .WAV, a lifecycle rule may define a rule which only selects .WAV voice files to filter interactions, ignoring all other media types.

Rule Name: Name of the lifecycle rule which will be useful for the users to distinguish multiple lifecycle rules for the same media type. Rule names may be defined by clients to make it convenient for them to differentiate multiple rules of the same media type. For example, distinguishing lifecycle rules for a media type of 'email' may have rule names such as "Daily-Email-Archival" or "Delete_Email_After_100_days_Team1" etc.

Action: The action required to be performed to the document or interaction. Additional information may be included in the action attribute, such as a storage class description describing different actions in different states of its storage lifecycle. The different states of an interaction lifecycle may include the stages or types of storage: for example, interactions may be stored differently at different phases of its lifecycle based on its age. For example, the current (active) storage action state which may, for example, be 5 years old, may have an action to "move to long term storage", and the long-term storage action state may be 10 years old, may have an action to "keep files forever". The Amazon S3 service provides multiple storage classes for a range of different use cases. For example, Amazon S3 Glacier storage is used for long term data archiving, ideal for a storage action of "keep files forever". The Amazon services provide additional storage classes such as S3 Standard, S3 Intelligent-Tiering, S3 Glacier, S3 Outposts, each with a different use case. The Action attribute may embody these different storage classes.

Start Date: Date on which lifecycle rule was activated.

After Number of Days: The time period, e.g. days, from the start date after which the desired action needs to be performed. Other time periods or measures may be used.

Applied Filter: The filter criteria for the rule, which may be considered the "if" portion. Interactions may have metadata or other descriptive data, associated with them, and this field contains the information to be used in filtering or determining the interaction which should be processed by the given rule: e.g. if an interaction meets of matches the rule's filter criteria, the "if" portion of the rule is met, and the action of the rule is taken on the interaction.

Status: Current status of the lifecycle rule. Only rules which are in active state, may be processed. Active state may be one of the states which denotes a lifecycle rule which is in force. For example other status states may be: pending, completed, scheduled, etc.

The actual operation, e.g. moving interaction to long-term storage, deleting the interaction, etc. may be performed in the object data store 60. A storage system such as object data store 60 may include a persistent store to have the object stored and retrieved. The persistent store may be on premises (e.g. disk store) or, elsewhere such as public cloud systems (e.g. the AWS S3 Simple storage services or the Microsoft Azure blob storage system).

Lifecycle rules processor 30 may be responsible for calculating and updating a ROS and a rule suspension time (RST) 35, described herein. Lifecycle rule picker 40 may select lifecycle rules based on, for example, the ROS or RST or any other data describing rules. The selected lifecycle rules may be given as input to the lifecycle rule processor 30, which may then execute each rule and take action defined by the rule on the interactions which apply to the rule (e.g. archive interactions more than X days old). In order to record subsequent data for use, the calculated ROS and RST is captured in the rule indexer 50. Rule indexer 50 may be queried by lifecycle rules picker 40 to select lifecycle rules based on the ROS and RST stored in the rule indexer 50.

Figure 2:
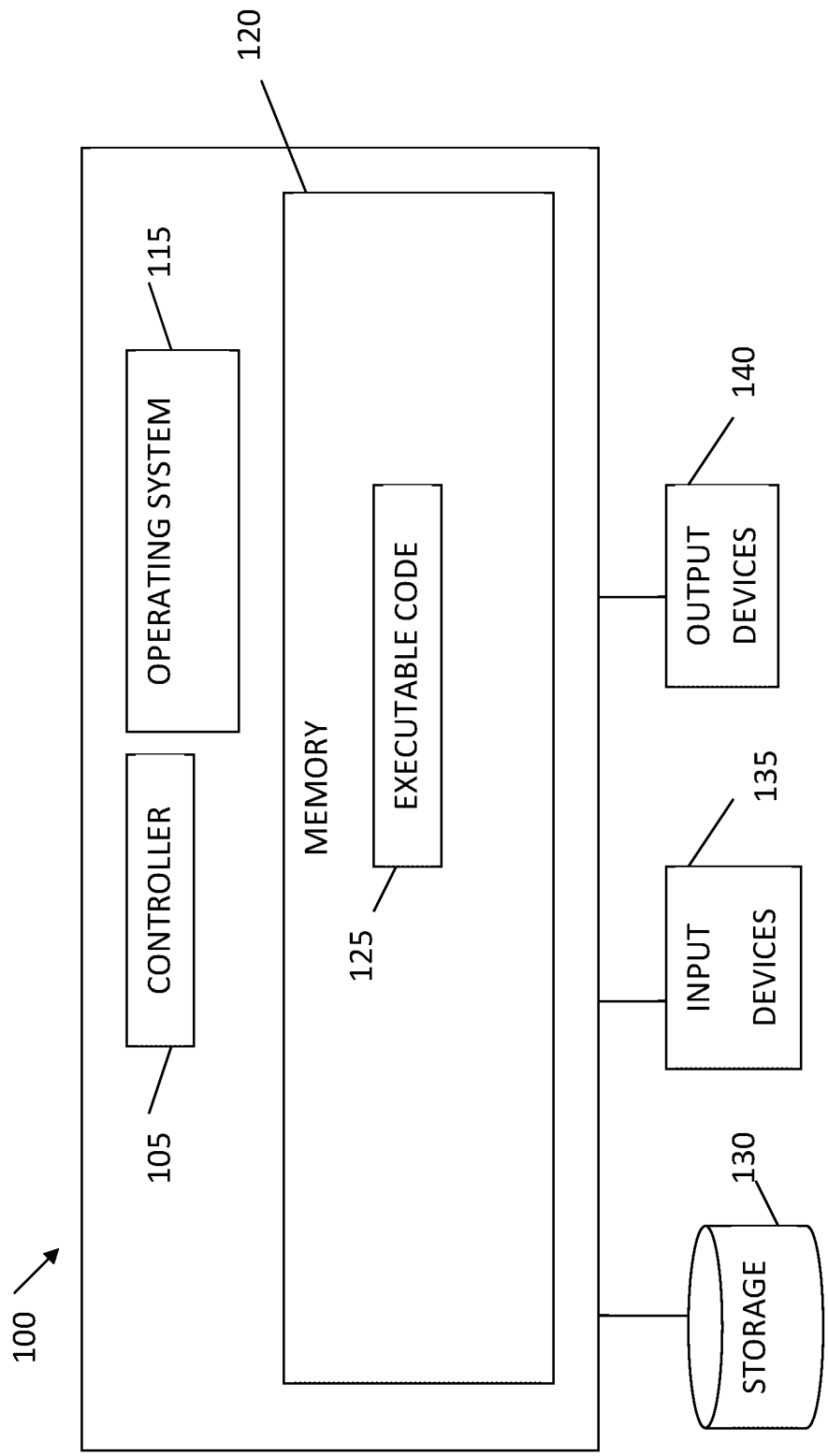
FIG. 2 is a high-level block diagram of an exemplary computing device which may be used with embodiments of the present invention.

In FIG. 2, an exemplary computing device which may be used with embodiments of the present invention is described. Computing device 100 may include a controller or processor 105 that may be, for example, a central processing unit processor (CPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications perform methods as disclosed herein, for example those of FIGS. 3-5, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
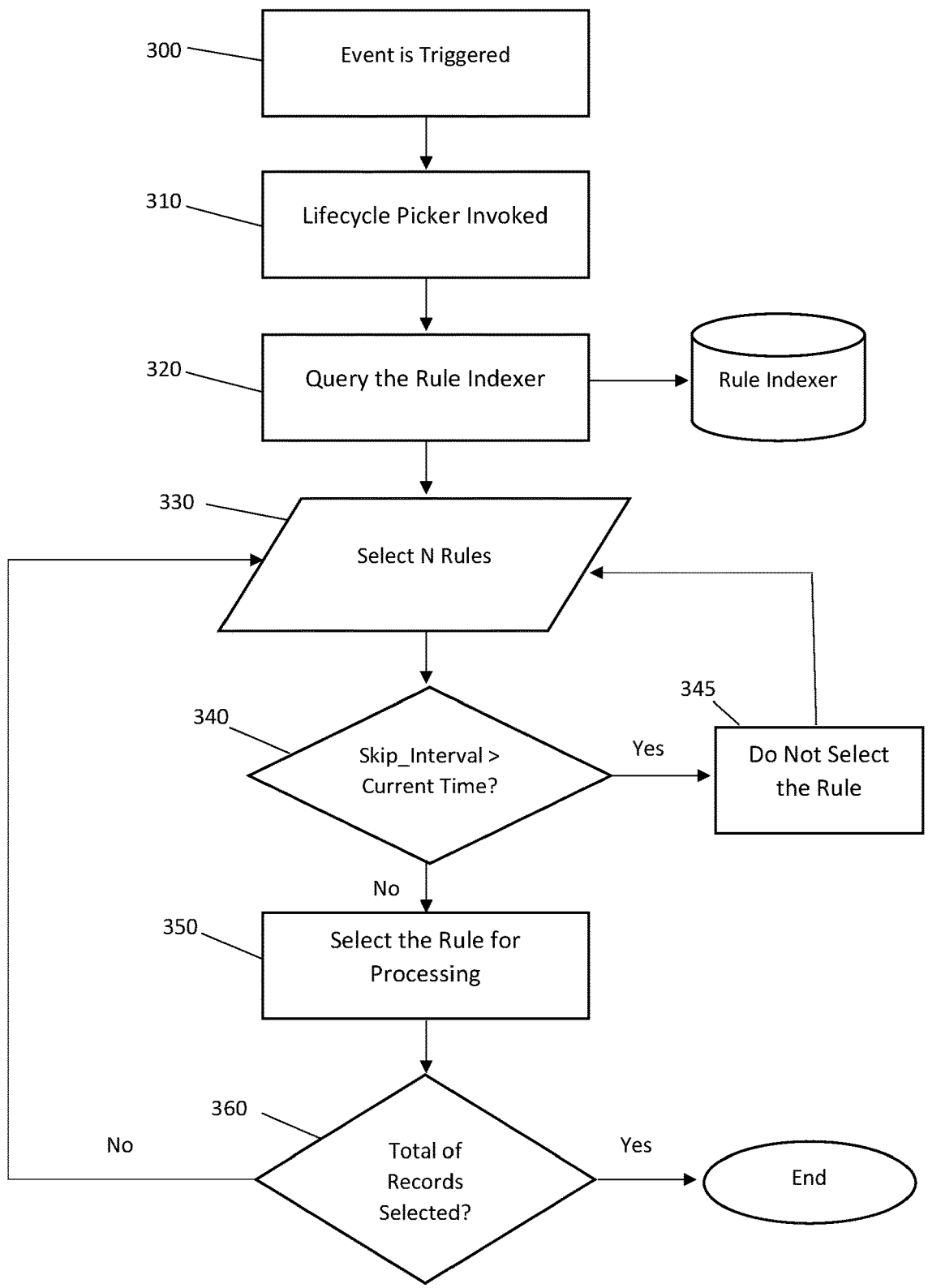
FIG. 3 is a flowchart illustrating the method of the lifecycle rules picker, according to embodiments of the present invention.

FIG. 3 is a flowchart that illustrates a method for lifecycle rules picker 40 to select lifecycle rules to be processed by the lifecycle rules processor 30, according to embodiments of the present invention. The embodiments of FIGS. 3-5 may be computer implemented methods performed, at least partly, by hardware and software components illustrated in FIGS. 1 and 2, but other hardware and software systems may be used. Lifecycle rule picker 40 may be responsible for selecting the batch of lifecycle rules to be executed and may consider the rule suspension time, selecting lifecycle rules which are not suspended from execution.

In FIG. 3, at step 300, an event may be triggered. For example, in the context of cloud-based systems, any changes in the cloud metrics (e.g. Amazon CloudWatch, Azure Monitor) environment may be considered an event. For example, the event may be triggered on a fixed interval of time using an event emitter or an event may be generated using a hardware device such as timer.

At step 310, the triggering event invokes the lifecycle rule picker algorithm.

At step 320, the rule indexer 50 may be queried by lifecycle rules picker 40 to obtain lifecycle rules. Lifecycle rules may be stored in the rule indexer 50. When a lifecycle rule is executed by the lifecycle rules processor 30, parameters describing the volume of interactions applied by the lifecycle rule, such as ROS and RST, may be computed and may be stored as an attribute in the rule indexer 50 along with other details. The selection of a lifecycle rule may be based on the ROS, determining whether or not to select the lifecycle rule for execution. The rule indexer 50 obtains and captures associated details of the lifecycle rules, which for example may include:

Action: Action to be performed if the "if" part of a rule is met, or if rule attributes match file attributes, e.g. Delete or archive to long term storage.

After Number of Days: Number of days from the creation date after which specified action is to be performed; other time periods or measures may be used.

Media Type: e.g. chat, email, call recording, screen recording etc.

Filter Criteria: e.g. agents, teams, skills which the interactions have as metadata.

Priority: If multiple lifecycle rules apply to an interaction, priority may be taken into consideration to identify which lifecycle rule should be applicable to the interaction. For example, if two lifecycle rules apply to an interaction, the lifecycle rule with high priority attribute will take precedence. Priority attribute may be an integer represented value, e.g. 1 for high priority and 10 for low priority. In some embodiments, interactions should not be processed by multiple lifecycle rules. Priority is useful when the interactions may be processed by multiple rules based on the filter criteria of the rules and interactions metadata. Interactions will be processed by only the high priority rule in such cases. For example, if a customer interaction belonging to the Team: "Team-X" is to be deleted after 3 years and all the other interactions to be deleted after 1 year, then the client may specify or create a rule with rule name: "Delete_After_3_Years" which deletes the interactions after 3 years (from the creation date) and specify a filter criteria as Team="Team-X". As this rule should take priority, this rule is assigned as Priority=1. A second rule is created with rule name: "Delete_After_1_Year" which deletes the interactions after 1 years (from the creation date). This rule will process all the interactions belonging to a common file type which is not linked with any high priority rule, e.g. Priority=2.

ROS: Value for rule occupancy score.

RST: Value for rule suspension time.

Skip Interval: Date and time of the lifecycle rule execution, the interval in which the rule is suspended from execution. For example, if the current time is 4:00 PM, a skip interval of 10 minutes will therefore have a skip interval time of 4:10 PM. Execution of the lifecycle rule will be suspended until 4:10 PM.

A lifecycle rule may be represented and take the form of a database file format, e.g. JSON, XML, etc. data types, but may take other forms. For example, a JSON file could for example represent a high priority email deletion lifecycle rule which, for interactions associated with a certain team, takes action to delete the interaction after 100 days of the creation of the interaction. Such a JSON file might have as for example key-value pairs the following; Action: delete, Media Type: email, Filter Criteria: Team: "Team-X", After Number of Days: 100, Priority: 1, ROS: 1, RST: 0, Skip Interval: 0.

At step 330, a conditional decision deciding whether to pick a lifecycle rule for processing or not pick for processing may persist, e.g. the picking of lifecycle rules will continually iterate or loop until the top N batch of rules are picked or selected. For example, a batch of the top N=100 lifecycle rules matching criteria or filter portion may be selected randomly, or in another manner. If there are more than N lifecycle rules eligible for selection, then rules may be selected in ascending order of its last execution time. This may prioritize lifecycle rules which have not been executed for an extended period. If the last execution time is unavailable, lifecycle rules may be selected in ascending order of its Start Date. A rule may in some embodiments have a status attribute in the active state in order to be eligible for selection. It may be appreciated that N may be any number of lifecycle rules to be processed or may be any position in a list. The top N rules may be selected to cater to a specific CCaaS client or may include rules which are high priority. For example, a particular CCaaS client may need to archive a large volume of customer service email messages in order to free up storage space. Therefore, a certain client may place a high priority on selecting lifecycle rules which include a media type of "email" and filter criteria of "agents".

At 340, the lifecycle rules selected for processing may be further filtered to determine whether or not a rule should be included as part of the top N rules. The decision depends on the Skip_Interval which is based on the ROS, calculated as the interval of time in which the lifecycle rule is suspended from execution. For example, if the current time is 4:00 pm and the Skip_Interval is 4:10 pm (10 minute skip), which is greater than the current time, the rule is suspended to a future time, then the rule should not be selected as part of the N rules in step 345. If the Skip_Interval, is less than or equal to the current time, for example 4:00 pm, in other words, not suspended from processing, then the rule is selected as part of the N rules for processing in step 350. Initially, or at the creation of any new life cycle rule, ROS for the rules may be defaulted to 1, meaning the Skip_Interval may be defaulted to 0. This will mean that new lifecycle rules will have the condition where the Skip_Interval equals the current time, and therefore the lifecycle rule will not be suspended from processing regardless of how many interactions are executed for the lifecycle rule. Subsequent processing cycles of new lifecycle rules may be based on the ROS (and therefore the calculated Skip_Interval), to determine whether or not the lifecycle rule is executed.

At 360, if a total of N rules are selected, the process ends. If, however, N rules have not been selected, the process repeats from step 330.

Figure 4:
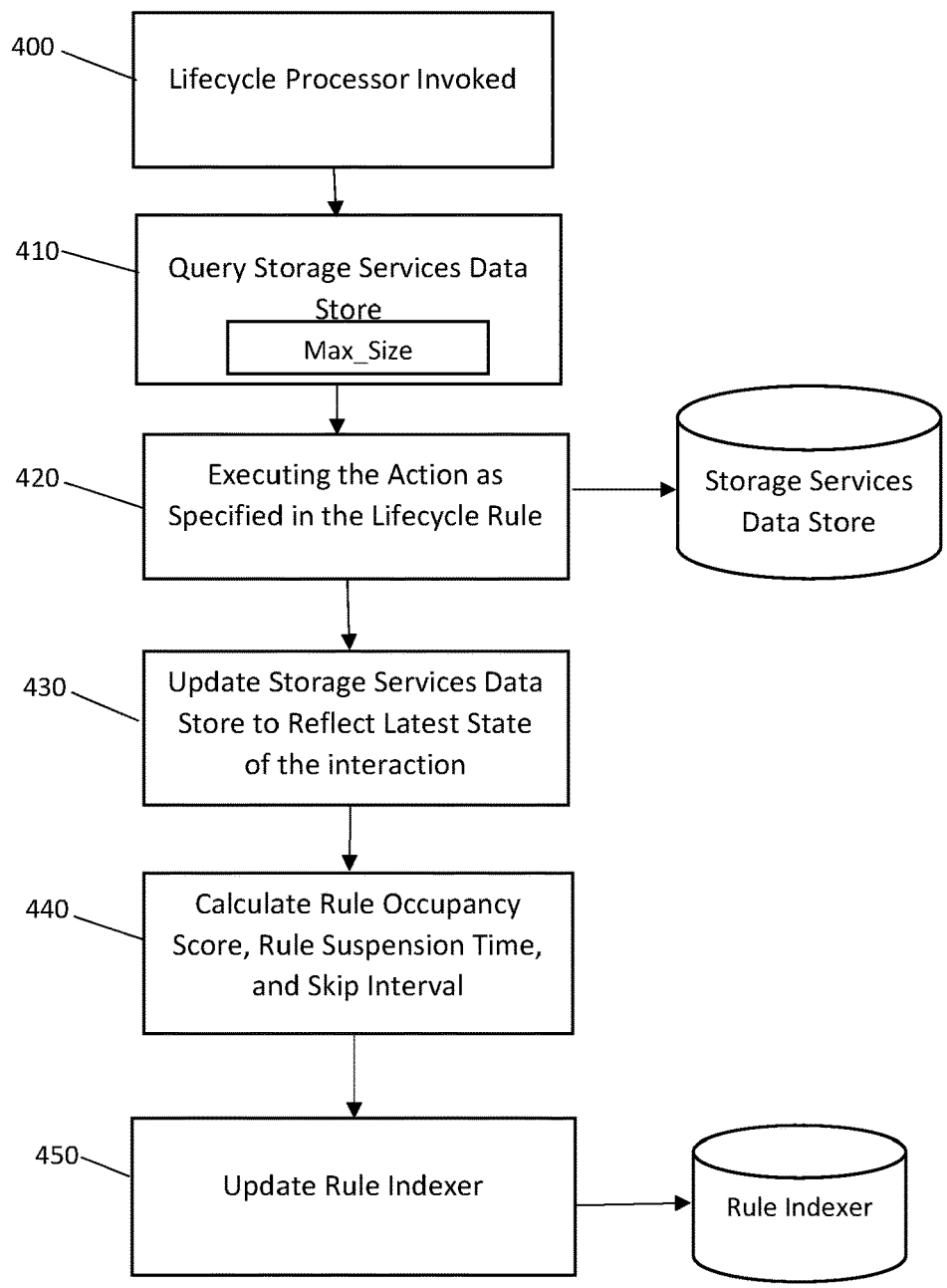
FIG. 4 is a flowchart that illustrates a method for the lifecycle rules processor to process lifecycle rules, according to embodiments of the present invention.

FIG. 4 illustrates a method for the lifecycle rules processor to process or execute rules, such as the selected lifecycle rules of the lifecycle rules picker 40, according to some embodiments of the invention. At operation 400, rules may be selected, e.g. the lifecycle processor is invoked for a lifecycle rule, for example selected as part of an embodiment in FIG. 3. For example, rules may be selected that are not suspended from execution (e.g. Skip_Interval of 0), and match a certain criteria, filter or priority. The lifecycle rule processor 30 may query the storage data store (e.g. storage services data store 10 of FIG. 1) in step 410, to find the files or interactions satisfying or matching the filter criteria, possibly with the limit of Max_Size. Factors determining if an interaction or file applies to a lifecycle rule may be based on the interaction's metadata and the filter criteria of a lifecycle rule. For example, if an interaction's metadata satisfies the filter criteria of a lifecycle rule then the interaction will be eligible for processing by the lifecycle rule. Storage service data 10 may keep metadata of interactions and may for example include configurable fields such as:

Tenant ID: Tenant to which the interaction belongs to. A tenant may be a client or user identified by a specific unique identification value. Multiple interactions may have the same TenantID.

Application: Source of interaction, e.g. a recording application or program, or an email application or a chat application or any other application which may have generated the interaction.

Campaign: An initiative or effort conducted by a team involving proactive calling to prospective customers or conducting targeted survey etc. Interactions, especially call recordings, might belong to some campaign.

Contact ID: Unique ID of the interaction.

Contact Date: Date of the interaction.

Media Type: e.g. chat, email, call recording, screen recording etc. In call center environments, additional attributes may be attached to interactions relating to the Agent:

Agent: Agent who has attended to or is involved in the interaction.

Skill: Skill of the agent who attended the interaction.

Team: Team to which the agent belongs to.

The lifecycle rule processor 30 may query the storage data store and select up to the Max_Size limit on a first come first serve basis. For example, if the Max_Size was 1000, a lifecycle rules may query up to the first 1000 results.

Rules may be matched to files, to find for each rule files to be processed. The "if" part or attributes of the rule may be used to search files, and for each rule those files matching the attributes may have the action of the rule executed on the file. For example, the lifecycle rule processor may query the metadata of the interactions to find the records which should be processed by the given lifecycle rule. Search_Result_Size may be set to the number of interactions satisfying this query; thus Search_Result_Size may be the number of interactions which match the lifecycle rules filter criteria. For example, suppose a client wishes to archive voice interactions data which is older than 5 years. A lifecycle rule with a filter criteria wherein the age of the interactions is greater than 5 years may be applied, the Search_Result_Size may denote the number of results satisfying this query criteria.

At step 420, the lifecycle rule is executed (e.g. the action of the rule is taken) on the interactions or files received as part of the query (e.g. performing the action data stored in rule indexer). For example, an interaction such as a call recording between an agent and a customer may be deleted from the data store.

At step 430, the data store is updated to reflect the latest state of the file or interaction. For example, an interaction which was deleted may be removed from the data store completely.

At step 440, parameters describing the usage of rules may be calculated: e.g., the ROS, RST, and Skip_Interval may be calculated. While these parameters are calculated at a certain example time in this example, these parameters may be calculated at a different time in different embodiments, and the operations may be executed in a different order. Based on the Skip_Interval, which may be based on the ROS, the Skip_Interval may be used to determine further processing opportunities of lifecycle rules. For example, a rule with a higher ROS will get more opportunities to be executed or processed as compared to a rule with a low ROS. The ROS may be a cyclical calculation, calculating the number or volume of previously executed interactions for or associated with each successive cycle. The ROS may take into account the number or volume of interactions processed in the previously executed interactions associated with the lifecycle rule, e.g. the number of files where the interaction matched the rule and the rule was executed on the file, prioritizing the lifecycle rules which have higher number or volume of interactions.

An example formula for calculating ROS may be:

$$ROS = 1 - \frac{\text{Max\_Size} - \text{Search\_Result\_size}}{\text{Max\_Size}}$$

ROS may in one example have a value between 0 and 1 inclusive; other ranges may be used. The ROS may be used to calculate a RST indicating a time period during which the lifecycle rule associated with the ROS is not executed. Rules with a low ROS may be suspended from processing for a predefined period of time. Therefore, a suspension of the rules with fewer interactions to process will give more opportunities to the rules with a higher ROS to process. A rule having low ROS will have a longer suspension time and a rule having a high ROS will have shorter suspension time. In this embodiment, suspension time will be calculated in minutes. However, the unit by which the metrics are calculated need not be minutes. The Skip_Interval may then be calculated as the RST added to the current timestamp.

For a given ROS, the following formula may be used to calculate RST:

$$\text{Let } N = (1 - ROS) * 10$$

$$RST_{ROS} = \frac{(1+\sqrt{5})^N - (1-\sqrt{5})^N}{2^N \sqrt{5}} * 10$$

A formula to calculate RST may use a formula to compute Nth Fibonacci number.

In one example for using formulas described herein to calculate ROS and RST, it is assumed the lifecycle picker executes in every 10 minutes. Other time periods may be used. The example below provides a simplified approach demonstrating only two rules, whereas in production there may be thousands of lifecycle rules in a CCaaS solution. Initially, it may be assumed that two lifecycle rules are selected with each lifecycle rule having a max_size of 2,500. It may also be assumed that lifecycle Rule-2 has a lower number or volume of interactions which meet or match the filter criteria of the lifecycle rule, thereby having less interactions matching the lifecycle rules criteria of Rule-2. These assumptions help demonstrate the ROS and how it may be used to optimize lifecycle rule processing. With the assumption that both rules are novel and are initialized with ROS=1, two lifecycle rule executions are shown below:

Table 1 below shows an example data store having a Max_Size of 2,500.

TABLE 1

| Rule ID | Max_Size | Search_Result_Size | ROS | RST | Skip_Interval |
|---|---|---|---|---|---|
| Rule-1 | 2,500 | | | | |
| Rule-2 | 2,500 | | | | |

Execution: 1
   Time: 1:00 PM
   Files processed by Rule-1: 2,500
   Files processed by Rule-2: 2,500
   Computation for Rule-1
      $ROS=1-(2{,}500-2{,}500)/2{,}500=1$
      $RST=((1+\sqrt{5}))^0-(1-\sqrt{5})^0)/(2^0\sqrt{5})*10=0$
   Computation for Rule-2
      $ROS=1-(2{,}500-2{,}500)/2500=1$
      $RST=((1+\sqrt{5}))^0-(1-\sqrt{5})^0)/(2^0\sqrt{5})*10=0$ Table 2 below shows the example data store which may have the following values after Execution 1. Since these are new lifecycle rules, ROS=1 for both Rule-1 and Rule-2.

TABLE 2

| Rule ID | Max_Size | Search_Result_Size | ROS | RST | Skip_Interval |
|---|---|---|---|---|---|
| Rule-1 | 2,500 | 2,500 | 1 | 0 | |
| Rule-2 | 2,500 | 2,500 | 1 | 0 | |

Execution: 2
   Time: 1:10 PM
   Files processed by Rule-1: 2,500
   Files processed by Rule-2: 500
   Computation for Rule-1
      $ROS=1-(2{,}500-2{,}500)/2{,}500=1$
      $RST=((1+\sqrt{5}))^0-(1-\sqrt{5})^0)/(2^0\sqrt{5})*10=0$
   Computation for Rule-2
      $ROS=1-(2{,}500-2{,}500)/2{,}500=0.2$
      $RST=((1+\sqrt{})^8-(1-\sqrt{5})^8)/(2^8\sqrt{5})*10=210$
   Skip interval will be calculated as −Current timestamp+ RST Table 3 shows the example data store which may have the values below after Execution 2. Rule-1 and Rule-2 (selected by lifecycle rules picker 40) both query storage data store 10 (Step 410 of FIG. 4) for interactions which meet the criteria of Rule-1 and Rule-2. However, under the assumption that lifecycle Rule-2 has a lower number or volume of interactions which meet the filter criteria of the lifecycle rule, the result of the query (Search_Result_Size) will therefore be lower. In this case, an assumption of only 500 results is provided.

TABLE 3

| Rule ID | Max_Size | Search_Result_Size | ROS | RST | Skip_Interval |
|---|---|---|---|---|---|
| Rule-1 | 2,500 | 2,500 | 1 | 0 | |
| Rule-2 | 2,500 | 500 | 0.2 | 210 | 4:40 PM |

In the succeeding processing opportunity when the lifecycle rules are selected, Rule-2 will not be selected until 4:40 PM (1:10 pm+210 minutes) on the same day as Rule-2 applies to a lower number or volume of interactions. Hence, future processing opportunities will be provided to other rules which meet the filter criteria of lifecycle rules. Therefore, processing opportunities for high yielding lifecycle rules are prioritized.

Table 4 below shows examples of a few RST calculations.

TABLE 4

| Max_Size | Search_Result_Size | ROS | RST (in minutes) |
|---|---|---|---|
| 2,500 | 2,500 | 1 | 0 |
| 2,500 | 2,000 | 0.8 | 10 |
| 2,500 | 1,400 | 0.56 | 30 |

TABLE 4-continued

| Max_Size | Search_Result_Size | ROS | RST (in minutes) |
|---|---|---|---|
| 2,500 | 400 | 0.16 | 210 |
| 2,500 | 0 | 0 | 550 |

At step 450, the rule indexer (50 of FIG. 1) may be updated. For example, the additional fields of ROS, RST, and skip interval will be updated at the rule indexer each processing opportunity.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of optimizing lifecycle rule computer processing, the method comprising using one or more processors in a computer server:
    selecting a set of lifecycle rules to apply to interaction files, wherein each of the lifecycle rules is represented as a database file and comprises an action affecting interaction storage, wherein the interaction files comprise recordings and metadata, and wherein the interaction files are stored using one or more buckets in a cloud system;
    for each rule, finding a set of interaction files satisfying criteria associated with the lifecycle rule;
    for each rule, calculating an associated rule occupancy score based on the number of executed interaction files associated with the rule;
    filtering one or more rules of the set of lifecycle rules, the filtering based on a rule suspension time, the rule suspension time calculated based on a formula to compute the Nth Fibonacci number;
    for each filtered rule, executing the filtered rule based on the rule occupancy score associated with the rule, wherein the execution of the rule comprises an action taken regarding moving one or more of the interaction files to a given class of storage of a plurality of Amazon S3 storage classes.

2. The method of claim 1, wherein for a rule, the rule occupancy score associated with the rule is used to calculate the rule suspension time indicating a period during which the rule associated with the rule occupancy score is not executed.

3. The method of claim 2, wherein the rule suspension time is used to calculate a skip interval denoting the time which a lifecycle rule is prevented from selection until said time.

4. The method of claim 1, wherein the set of interactions for each rule is limited to a maximum number of interactions.

5. The method of claim 1, wherein selecting the set of lifecycle rules is limited to a batch size.

6. The method of claim 1, wherein for a new lifecycle rule, the associated rule occupancy score is initialized to 1.

7. The method of claim 1, wherein the interactions comprises interactions data in a call center environment.

8. The method of claim 1, wherein for a rule, an action attribute indicates the action to be executed on the set of interactions.

9. A system for optimizing lifecycle rule computer processing, the system comprising:
    a memory; and
    a processor, the processor configured to:
        select a set of lifecycle rules to apply to interaction files, wherein each of the lifecycle rules is represented as a database file and comprises an action affecting interaction storage, wherein the interaction files comprise recordings and metadata, and wherein the interaction files are stored using one or more buckets in a cloud system;
        for each rule, find a set of interaction files satisfying criteria associated with the lifecycle rule;
        for each rule, calculate an associated rule occupancy score based on the number of executed interaction files associated with the rule;
        filter one or more rules of the set of lifecycle rules, the filtering based on a rule suspension time, the rule suspension time calculated based on a formula to compute the Nth Fibonacci number;
        for each filtered rule, execute the filtered rule based on the rule occupancy score associated with the rule, wherein the execution of the rule comprises an action taken regarding moving one or more of the interaction files to a given class of storage of a plurality of Amazon S3 storage classes.

10. The system of claim 9, wherein for a rule, the rule occupancy score associated with the rule is used to calculate the rule suspension time indicating a period during which the rule associated with the rule occupancy score is not executed.

11. The system of claim 10, wherein the rule suspension time is used to calculate a skip interval denoting the time which a lifecycle rule is prevented from selection until said time.

12. The system of claim 9, wherein the set of interactions for each rule is limited by a maximum number of interactions.

13. The system of claim 9, wherein selecting the set of lifecycle rules is limited to a batch size.

14. The system of claim 9, wherein for a new lifecycle rule, the associated rule occupancy score is initialized to 1.

15. A non-transitory storage medium storing instructions executed by one or more processors to perform a method for lifecycle rules management, the method comprising:
    selecting a set of lifecycle rules to apply to interaction files, wherein each of the lifecycle rules is represented as a database file and comprises an action affecting interaction storage, wherein the interaction files comprise recordings and metadata, and wherein the interaction files are stored using one or more buckets in a cloud system;
    for each rule, obtaining a set of interaction files matching criteria associated with the lifecycle rule;
    for each rule, calculating an associated rule occupancy score based on the number of executed interaction files associated with the rule;
    filtering one or more rules of the set of lifecycle rules, the filtering based on a rule suspension time, the rule suspension time calculated based on a formula to compute the Nth Fibonacci number;
    for each filtered rule, processing the filtered rule based on the rule occupancy score associated with the rule, wherein the execution of the rule comprises an action taken regarding moving one or more of the interaction files to a given class of storage of a plurality of Amazon S3 storage classes.

16. The non-transitory storage medium of claim 15, wherein the rule occupancy score is a ratio of the number of executed interaction files associated with the rule to a predetermined maximum number of interaction files.

17. The non-transitory storage medium of claim 15, wherein the rule occupancy score is initialized to 1 for new lifecycle rules.

* * * * *